United States Patent
Sun et al.

(10) Patent No.: US 12,273,906 B2
(45) Date of Patent: Apr. 8, 2025

(54) FLEXIBLE APERIODIC SRS TRIGGERING IN A CELLULAR COMMUNICATION SYSTEM

(71) Applicant: Apple Inc., Cupertino, CA (US)

(72) Inventors: Haitong Sun, Irvine, CA (US); Yushu Zhang, Beijing (CN); Huaning Niu, San Jose, CA (US); Hong He, Cupertino, CA (US); Wei Zeng, San Diego, CA (US); Chunxuan Ye, San Diego, CA (US); Oghenekome Oteri, San Diego, CA (US); Sigen Ye, Whitehouse Station, NJ (US); Dawei Zhang, Saratoga, CA (US); Chunhai Yao, Beijing (CN); Jie Cui, San Jose, CA (US); Yang Tang, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 333 days.

(21) Appl. No.: 17/439,024

(22) PCT Filed: Oct. 12, 2020

(86) PCT No.: PCT/CN2020/120441
§ 371 (c)(1),
(2) Date: Sep. 14, 2021

(87) PCT Pub. No.: WO2022/077170
PCT Pub. Date: Apr. 21, 2022

(65) Prior Publication Data
US 2022/0303998 A1  Sep. 22, 2022

(51) Int. Cl.
*H04W 72/542* (2023.01)
*H04L 5/00* (2006.01)
(Continued)

(52) U.S. Cl.
CPC .......... *H04W 72/542* (2023.01); *H04L 5/0051* (2013.01); *H04W 72/0446* (2013.01); *H04W 72/23* (2023.01)

(58) Field of Classification Search
CPC ........... H04W 72/542; H04W 72/0446; H04W 72/23; H04L 5/0051; H04L 5/0087;
(Continued)

(56) References Cited

U.S. PATENT DOCUMENTS 11,115,973 B2 * 9/2021 Jin .................... H04W 72/046
11,277,301 B2 * 3/2022 Zhou ................... H04W 72/23
(Continued)

FOREIGN PATENT DOCUMENTS

CN    101808409 A    8/2010
CN    110650001      1/2020
(Continued)

OTHER PUBLICATIONS

International Search Report for PCT Patent Application No. PCT/CN2020/120441; mailed Jun. 24, 2021.
(Continued)

*Primary Examiner* — Kibrom T Hailu
(74) *Attorney, Agent, or Firm* — Kowert, Hood, Munyon, Rankin & Goetzel, P.C.

(57) ABSTRACT

A cellular base station (BS) which transmits more flexible downlink control information (DCI) to the UE, and a UE capable of receiving and processing a received DCI message. The DCI message may have a DCI format of 0_1 or 0_2 and further may comprise an UL-SCH set to 0, a CSI request field of all 0s and an SRS request field having a nonzero value. The DCI message may indicate to the UE that the UE should: 1) transmit an aperiodic SRS corresponding to SRS request; and 2) that the UE should not transmit on the PUSCH. The DCI may include existing fields that specify
(Continued)

either a slot offset or beam information useable when transmitting the aperiodic SRS. The base station may also generate a DCI message with an SRS trigger that is targeted to a plurality of UEs in a group, or a plurality of groups of UEs, for greater efficiency.

20 Claims, 8 Drawing Sheets

(51) Int. Cl.
*H04W 72/0446* (2023.01)
*H04W 72/23* (2023.01)

(58) Field of Classification Search
CPC ..... H04L 27/261; H04L 5/001; H04L 5/0023; H04L 5/0053; H04L 5/0096; H04L 5/0048
See application file for complete search history.

(56) References Cited

U.S. PATENT DOCUMENTS

| | | | |
|---|---|---|---|
| 11,564,229 B2* | 1/2023 | Jin | H04L 5/001 |
| 11,589,382 B2* | 2/2023 | Zhou | H04W 72/0446 |
| 2011/0199944 A1 | 8/2011 | Chen | |
| 2019/0356431 A1 | 11/2019 | Manolakos | |
| 2020/0107353 A1 | 4/2020 | Jung | |
| 2020/0127777 A1 | 4/2020 | Papasakellariou | |
| 2020/0267750 A1* | 8/2020 | Park | H04W 72/0446 |
| 2020/0314818 A1* | 10/2020 | Jin | H04W 72/046 |
| 2021/0105780 A1* | 4/2021 | Jin | H04W 72/1273 |
| 2021/0159966 A1* | 5/2021 | Xi | H04B 7/088 |
| 2022/0330300 A1 | 10/2022 | Wang | |
| 2022/0345195 A1* | 10/2022 | Jang | H04L 5/0094 |
| 2023/0155774 A1* | 5/2023 | Okamura | H04W 72/232 370/329 |
| 2023/0276454 A1* | 8/2023 | Zhu | H04L 5/0053 370/329 |

FOREIGN PATENT DOCUMENTS

| | | |
|---|---|---|
| WO | 2017173388 A1 | 10/2017 |
| WO | 2019213914 A1 | 11/2019 |

OTHER PUBLICATIONS

Huawei et al. "DCI design for SRS switching"; 3GPP TSG RAN WG1 Meeting #86bis R1-1608588; Lisbon, Portugal; Oct. 10-14, 2016.
Nokia "Introduction of NR enhanced MIMO" 3GPP TSG-RAN WG1 Meeting #99 R1-1913655; Reno, USA; Nov. 18-22, 2019.
Extended European Search Report for EP Patent Application No. 20956952.4; Jan. 23, 2024.
Extended European Search Report for EP Patent Application No. 23204838.9; Jan. 22, 2024.
Nokia et al. "Joint group DCI for SRS switching"; 3GPP TSG-RAN WG1 Meeting #86bis R1-1609882; Oct. 10, 2016.
Alcatel-Lucent et al. "Remaining Issues of Dynamic aperiodic SRS"; 3GPP TSG-RAN WG1 #61bis R1-104095; Jun. 28, 2010.
Office Action for CN Patent Application No. 202080106112.9; Jun. 29, 2024.
Panasonic "Aperiodic SRS triggering with DL DCI", 3GPP TSG RAN WG1 R1-110774, Feb. 21, 2011.

* cited by examiner

FLEXIBLE APERIODIC SRS TRIGGERING IN A CELLULAR COMMUNICATION SYSTEM

PRIORITY CLAIM INFORMATION

This application is a national stage application of International Application No. PCT/CN2020/120441, filed on Oct. 12, 2020 titled "Flexible Aperiodic SRS Triggering in a Cellular Communication System", which is hereby incorporated by reference in its entirety. The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

FIELD

The invention relates to wireless communications, and more particularly to apparatuses, systems, and methods for more flexible provision of triggering signaling to trigger UE transmission of an aperiodic sounding reference signal.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices now provide access to the internet, email, text messaging, and navigation using the global positioning system (GPS), and are capable of operating sophisticated applications that utilize these functionalities.

Long Term Evolution (LTE) is currently the technology of choice for the majority of wireless network operators worldwide, providing mobile broadband data and high-speed Internet access to their subscriber base. LTE was first proposed in 2004 and was first standardized in 2008. Since then, as usage of wireless communication systems has expanded exponentially, demand has risen for wireless network operators to support a higher capacity for a higher density of mobile broadband users. Thus, in 2015 study of a new radio access technology began and, in 2017, a first release of Fifth Generation New Radio (5G NR) was standardized.

5G-NR, also simply referred to as NR, provides, as compared to LTE, a higher capacity for a higher density of mobile broadband users, while also supporting device-to-device, ultra-reliable, and massive machine type communications with lower latency and/or lower battery consumption. Further, NR may allow for more flexible UE scheduling as compared to current LTE. Consequently, efforts are being made in ongoing developments of 5G NR to take advantage of higher throughputs possible at higher frequencies.

One aspect of current cellular communication operation is provision by the UE of a Sounding Reference Signal (SRS) to the base station to enable the base station to assess the quality of the uplink channel. Improvements in the field are desired.

SUMMARY

Embodiments relate to wireless communications, and more particularly to apparatuses, systems, and methods for more flexible triggering of aperiodic SRS transmission by a UE.

Some embodiments relate to a cellular base station (BS) comprising a plurality of antennas, a radio operably coupled to the plurality of antennas, and a processor operably coupled to the radio. The cellular base station may be configured to determine that a UE should transmit an aperiodic sounding reference signal (SRS) to the base station. In response to this determination, the base station may transmit downlink control information (DCI) to the UE. The downlink control information (DCI) may also indicate to the UE that the UE should transmit an aperiodic SRS to the base station. The DCI may also include one or more parameter fields set to indicate that no uplink shared channel data is requested from the UE. Thus, the DCI message may specify that the UE is to transmit an SRS message without any accompanying data from the UE on the uplink shared channel.

The DCI message may have a DCI format of 0_1 or 0_2. Further, the DCI message may comprise an uplink shared channel indicator set to 0, a channel state information (CSI) request field of all 0s and an SRS request field having a nonzero value. The DCI message may indicate to the UE that the UE should: 1) transmit an aperiodic SRS corresponding to the nonzero value in the SRS request field to the base station; and 2) that the UE should not transmit on the physical uplink shared channel.

The DCI may include a time domain resource assignment field having a value that specifies a slot offset of the aperiodic SRS. The DCI may also include an SRS resource indicator field that specifies beam information useable by the UE when transmitting the aperiodic SRS to the base station.

Where the DCI comprises a channel state information (CSI) request field with value 0, an uplink shared channel indicator (UL-SCH) field with value 0 and an SRS request field of value 0, this DCI message may be interpreted by the UE as an invalid DCI.

The base station may also be configured to generate a DCI message with an SRS trigger that is targeted to a plurality of UEs in a group, or even further to a plurality of groups of UEs, wherein each group comprises a plurality of UEs. This allows the base station to more efficiently provide an SRS trigger to each of a plurality of UEs with reduced transmission overhead.

Embodiments described herein also relate to a user equipment (UE) that is capable of receiving and processing a received DCI message as set out above, and which is capable of transmitting an SRS in response thereto.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which.

Figure 1A:
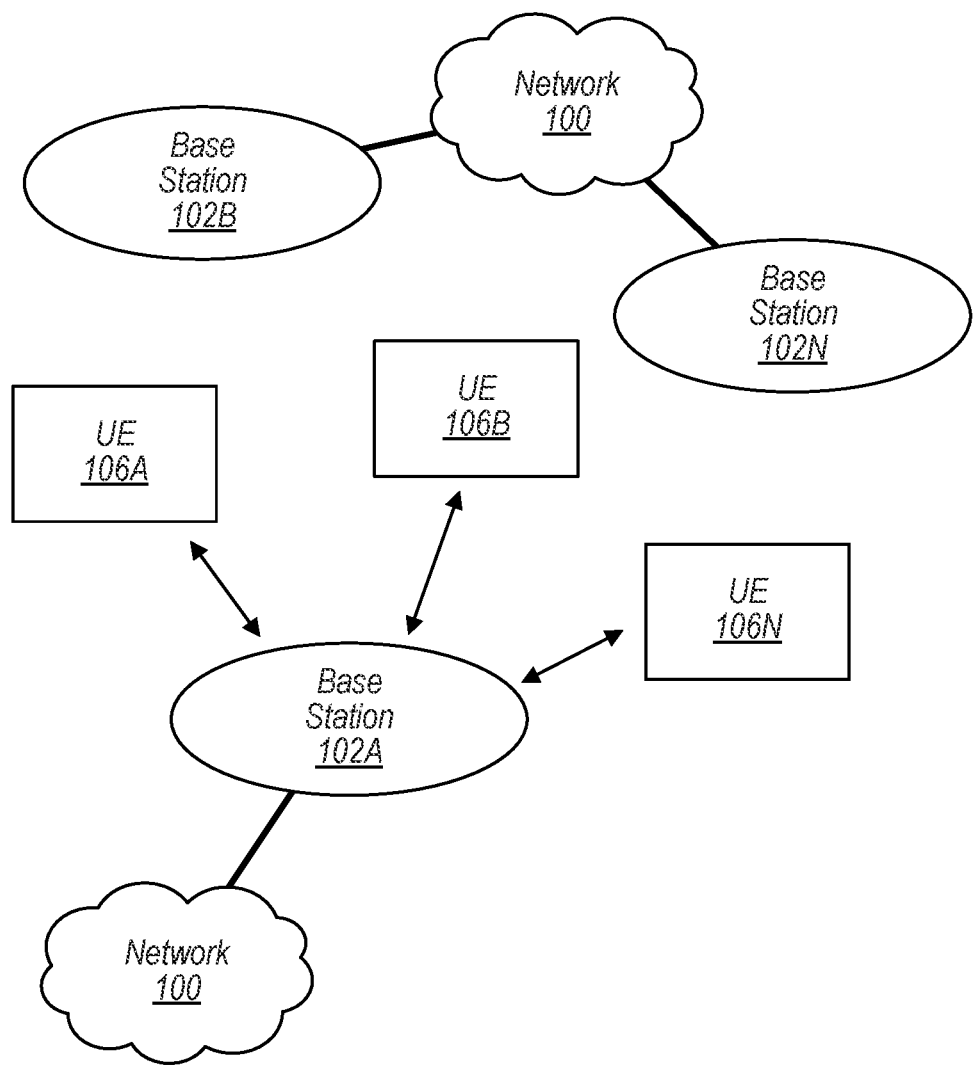
FIG. 1A illustrates an example wireless communication system according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present disclosure. Definitions of the most prominently used acronyms that may appear throughout the present disclosure are provided below:

3GPP: Third Generation Partnership Project
UE: User Equipment
RF: Radio Frequency
BS: Base Station
DL: Downlink
UL: Uplink
LTE: Long Term Evolution
NR: New Radio
5GS: 5G System
5GMM: 5GS Mobility Management
5GC/5GCN: 5G Core Network
SRS: Sounding Reference Signal
AP-SRS: Aperiodic Sounding Reference Signal
IE: Information Element
CE: Control Element
MAC: Medium Access Control
SSB: Synchronization Signal Block
CSI-RS: Channel State Information Reference Signal
PDCCH: Physical Downlink Control Channel
PDSCH: Physical Downlink Shared Channel
RRC: Radio Resource Control
RRM: Radio Resource Management
TCI: Transmission Configuration Indicator
DCI: Downlink Control Information
RNTI: Radio Network Temporary Identifier Terms The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g. smart watch, smart glasses), PDAs, portable Internet devices, music players, data storage devices, other handheld devices, unmanned aerial vehicles (UAVs) (e.g., drones), UAV controllers (UACs), and so forth. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element (or Processor)—refers to various elements or combinations of elements that are capable of performing a function in a device, such as a user equipment or a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Wi-Fi—The term "Wi-Fi" (or WiFi) has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

3GPP Access—refers to accesses (e.g., radio access technologies) that are specified by 3GPP standards. These accesses include, but are not limited to, GSM/GPRS, LTE, LTE-A, and/or 5G NR. In general, 3GPP access refers to various types of cellular access technologies.

Non-3GPP Access—refers any accesses (e.g., radio access technologies) that are not specified by 3GPP standards. These accesses include, but are not limited to, WiMAX, CDMA2000, Wi-Fi, WLAN, and/or fixed networks. Non-3GPP accesses may be split into two categories, "trusted" and "untrusted": Trusted non-3GPP accesses can interact directly with an evolved packet core (EPC) and/or a 5G core (5GC) whereas untrusted non-3GPP accesses interwork with the EPC/5GC via a network entity, such as an Evolved Packet Data Gateway and/or a 5G NR gateway. In general, non-3GPP access refers to various types on non-cellular access technologies.

Automatically—refers to an action or operation performed by a computer system (e.g., software executed by the computer system) or device (e.g., circuitry, programmable hardware elements, ASICs, etc.), without user input directly specifying or performing the action or operation. Thus, the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some embodiments, "approximately" may mean within 0.1% of some specified or desired value, while in various other embodiments, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

Figure 1B:
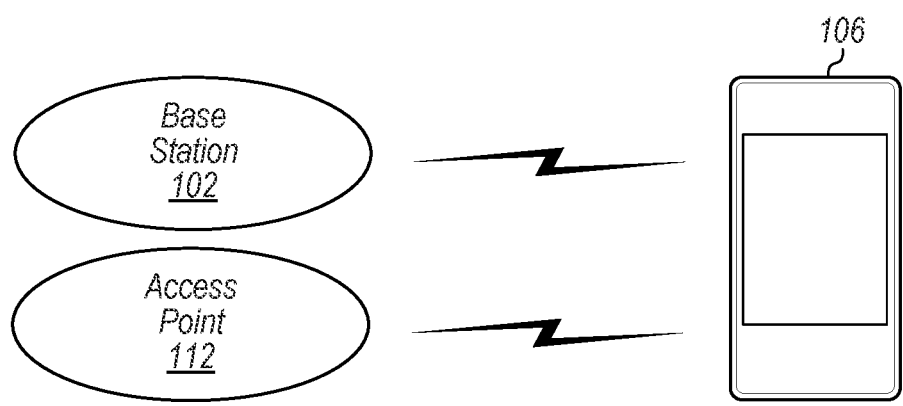
FIG. 1B illustrates an example of a base station (BS) and an access point in communication with a user equipment (UE) device according to some embodiments.

FIGS. 1A and 1B: Communication Systems

FIG. 1A illustrates a simplified example wireless communication system, according to some embodiments. It is noted that the system of FIG. 1A is merely one example of a possible system, and that features of this disclosure may be implemented in any of various systems, as desired.

As shown, the example wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station") and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1×RTT, 1×EV-DO, HRPD, eHRPD), etc. Note that if the base station 102A is implemented in the context of LTE, it may alternately be referred to as an 'eNodeB' or 'eNB'. Note that if the base station 102A is implemented in the context of 5G NR, it may alternatively be referred to as 'gNodeB' or 'gNB'.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some embodiments, base station 102A may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transition and reception points (TRPs). In addition, a UE capable of operating according to 5G NR may be connected to one or more TRPs within one or more gNBs.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

FIG. 1B illustrates user equipment 106 (e.g., one of the devices 106A through 106N) in communication with a base station 102 and an access point 112, according to some embodiments. The UE 106 may be a device with both cellular communication capability and non-cellular communication capability (e.g., Bluetooth, Wi-Fi, and so forth) such as a mobile phone, a hand-held device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols or technologies. In some embodiments, the UE 106 may be configured to communicate using, for example, CDMA2000 (1×RTT/1×EV-DO/HRPD/eHRPD), LTE/LTE-Advanced, or 5G NR using a single shared radio and/or GSM, LTE, LTE-Advanced, or 5G NR using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or LTE or 1×RTT or LTE or GSM), and separate radios for communicating using each of Wi-Fi and Bluetooth. Other configurations are also possible.

Figure 2:
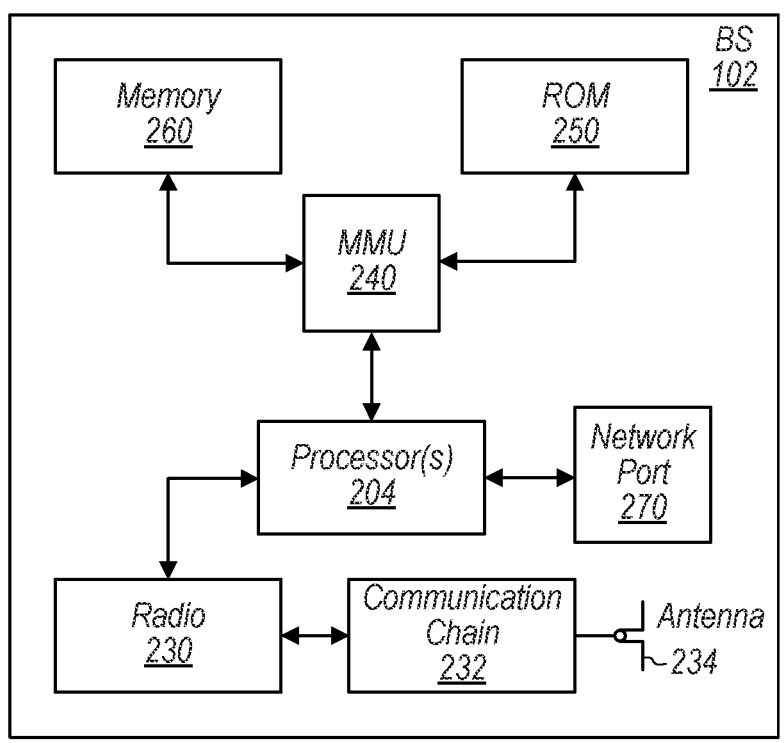
FIG. 2 illustrates an example block diagram of a BS according to some embodiments.

FIG. 2: Base Station Block Diagram

Figure 3:
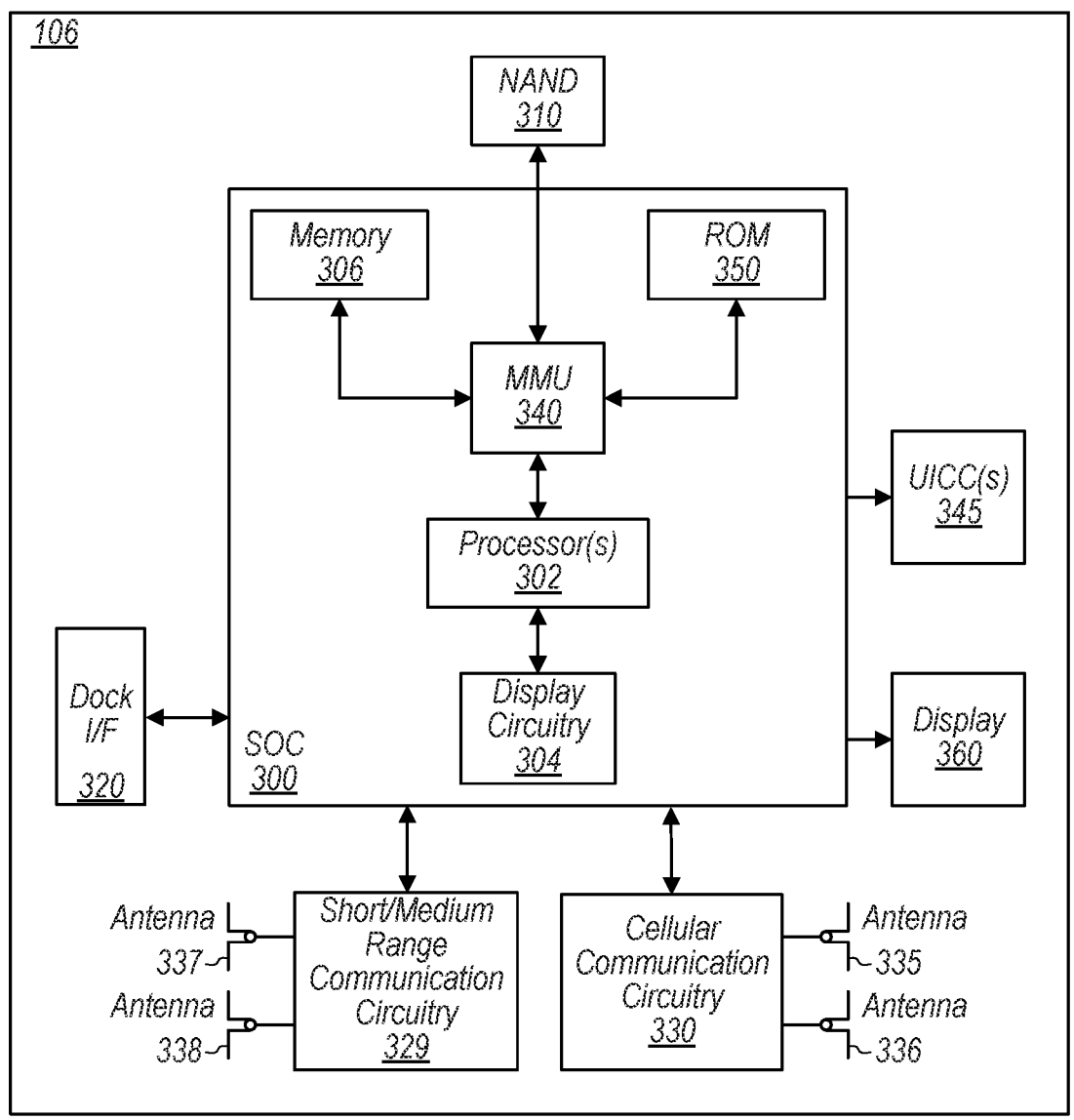
FIG. 3 illustrates an example block diagram of a UE according to some embodiments.

FIG. 2 illustrates an example block diagram of a base station 102, according to some embodiments. It is noted that the base station of FIG. 3 is merely one example of a possible base station. As shown, the base station 102 may include processor(s) 204 which may execute program instructions for the base station 102. The processor(s) 204 may also be coupled to memory management unit (MMU) 240, which may be configured to receive addresses from the processor(s) 204 and translate those addresses to locations in memory (e.g., memory 260 and read only memory (ROM) 250) or to other circuits or devices.

The base station 102 may include at least one network port 270. The network port 270 may be configured to couple to a telephone network and provide a plurality of devices, such as UE devices 106, access to the telephone network as described above in FIGS. 1 and 2.

The network port 270 (or an additional network port) may also or alternatively be configured to couple to a cellular network, e.g., a core network of a cellular service provider. The core network may provide mobility related services and/or other services to a plurality of devices, such as UE devices 106. In some cases, the network port 270 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transition and reception points (TRPs). In addition, a UE capable of operating according to 5G NR may be connected to one or more TRPs within one or more gNBs.

The base station 102 may include at least one antenna 234, and possibly multiple antennas. The at least one antenna 234 may be configured to operate as a wireless transceiver and may be further configured to communicate with UE devices 106 via radio 230. The antenna 234 communicates with the radio 230 via communication chain 232. Communication chain 232 may be a receive chain, a transmit chain or both. The radio 230 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 204 of the base station 102 may be configured to implement or support implementation of part or all of the methods described herein, e.g., by executing program instructions stored on a memory medium (e.g., a non-transitory computer-readable memory medium). Alternatively, the processor 204 may be configured as a programmable hardware element, such as an FPGA (Field Programmable Gate Array), or as an ASIC (Application Specific Integrated Circuit), or a combination thereof. Alternatively (or in addition) the processor 204 of the BS 102, in conjunction with one or more of the other components 230, 232, 234, 240, 250, 260, 270 may be configured to implement or support implementation of part or all of the features described herein.

In addition, as described herein, processor(s) 204 may be comprised of one or more processing elements. In other words, one or more processing elements may be included in processor(s) 204. Thus, processor(s) 204 may include one or more integrated circuits (ICs) that are configured to perform the functions of processor(s) 204. In addition, each integrated circuit may include circuitry (e.g., first circuitry, second circuitry, etc.) configured to perform the functions of processor(s) 204.

Further, as described herein, radio 230 may be comprised of one or more processing elements. In other words, one or more processing elements may be included in radio 230. Thus, radio 230 may include one or more integrated circuits (ICs) that are configured to perform the functions of radio 230. In addition, each integrated circuit may include circuitry (e.g., first circuitry, second circuitry, etc.) configured to perform the functions of radio 230.

FIG. 3: UE Block Diagram

FIG. 3 illustrates an example simplified block diagram of a communication device 106, according to some embodiments. It is noted that the block diagram of the communication device of FIG. 3 is only one example of a possible communication device. According to embodiments, communication device 106 may be a user equipment (UE) device, a mobile device or mobile station, a wireless device or wireless station, a desktop computer or computing device, a mobile computing device (e.g., a laptop, notebook, or portable computing device), a tablet, an unmanned aerial vehicle (UAV), a UAV controller (UAC) and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash 310), an input/output interface such as connector I/F 320 (e.g., for connecting to a computer system; dock; charging station; input devices, such as a microphone, camera, keyboard; output devices, such as speakers; etc.), the display 360, which may be integrated with or external to the communication device 106, and cellular communication circuitry 330 such as for 5G NR, LTE, GSM, etc., and short to medium range wireless communication circuitry 329 (e.g., Bluetooth™ and WLAN circuitry). In some embodiments, communication device 106 may include wired communication circuitry (not shown), such as a network interface card, e.g., for Ethernet.

The cellular communication circuitry 330 may couple (e.g., communicatively; directly or indirectly) to one or more antennas, such as antennas 335 and 336 as shown. The short to medium range wireless communication circuitry 329 may also couple (e.g., communicatively; directly or indirectly) to one or more antennas, such as antennas 337 and 338 as shown. Alternatively, the short to medium range wireless communication circuitry 329 may couple (e.g., communicatively; directly or indirectly) to the antennas 335 and 336 in addition to, or instead of, coupling (e.g., communicatively; directly or indirectly) to the antennas 337 and 338. The short to medium range wireless communication circuitry 329 and/or cellular communication circuitry 330 may include multiple receive chains and/or multiple transmit chains for receiving and/or transmitting multiple spatial streams, such as in a multiple-input multiple output (MIMO) configuration.

In some embodiments, as further described below, cellular communication circuitry 330 may include dedicated receive chains (including and/or coupled to, e.g., communicatively; directly or indirectly. dedicated processors and/or radios) for multiple RATs (e.g., a first receive chain for LTE and a second receive chain for 5G NR). In addition, in some embodiments, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with an additional radio, e.g., a second radio that may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345. Note that the term "SIM" or "SIM entity" is intended to include any of various types of SIM implementations or SIM functionality, such as the one or more UICC(s) cards 345, one or more eUICCs, one or more eSIMs, either removable or embedded, etc. In some embodiments, the UE 106 may include at least two SIMs. Each SIM may execute one or more SIM applications and/or otherwise implement SIM functionality. Thus, each SIM may be a single smart card that may be embedded, e.g., may be soldered onto a circuit board in the UE 106, or each SIM 345 may be implemented as a removable smart card. Thus the SIM(s) may be one or more removable smart cards (such as UICC cards, which are sometimes referred to as "SIM cards"), and/or the SIMs 345 may be one or more embedded cards (such as embedded UICCs (eUICCs), which are sometimes referred to as "eSIMs" or "eSIM cards"). In some embodiments (such as when the SIM(s) include an eUICC), one or more of the SIM(s) may implement embedded SIM (eSIM) functionality; in such an embodiment, a single one of the SIM(s) may execute multiple SIM applications. Each of the SIMs may include components such as a processor and/or a memory; instructions for performing SIM/eSIM functionality may be stored in the memory and executed by the processor. In some embodiments, the UE 106 may include a combination of removable smart cards and fixed/non-removable smart cards (such as one or more eUICC cards that implement eSIM functionality), as desired. For example, the UE 106 may comprise two embedded SIMs, two removable SIMs, or a combination of one embedded SIMs and one removable SIMs. Various other SIM configurations are also contemplated.

As noted above, in some embodiments, the UE 106 may include two or more SIMs. The inclusion of two or more SIMs in the UE 106 may allow the UE 106 to support two different telephone numbers and may allow the UE 106 to communicate on corresponding two or more respective networks. For example, a first SIM may support a first RAT such as LTE, and a second SIM 345 support a second RAT such as 5G NR. Other implementations and RATs are of course possible. In some embodiments, when the UE 106 comprises two SIMs, the UE 106 may support Dual SIM Dual Active (DSDA) functionality. The DSDA functionality may allow the UE 106 to be simultaneously connected to two networks (and use two different RATs) at the same time, or to simultaneously maintain two connections supported by two different SIMs using the same or different RATs on the same or different networks. The DSDA functionality may also allow the UE 106 to simultaneously receive voice calls or data traffic on either phone number. In certain embodiments the voice call may be a packet switched communication. In other words, the voice call may be received using voice over LTE (VoLTE) technology and/or voice over NR (VoNR) technology. In some embodiments, the UE 106 may support Dual SIM Dual Standby (DSDS) functionality. The DSDS functionality may allow either of the two SIMs in the UE 106 to be on standby waiting for a voice call and/or data connection. In DSDS, when a call/data is established on one SIM, the other SIM is no longer active. In some embodiments, DSDx functionality (either DSDA or DSDS functionality) may be implemented with a single SIM (e.g., a eUICC) that executes multiple SIM applications for different carriers and/or RATs.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, short to medium range wireless communication circuitry 329, cellular communication circuitry 330, connector I/F 320, and/or display 360. The MMU 340 may be configured to perform memory protection and page table translation or set up. In some embodiments, the MMU 340 may be included as a portion of the processor(s) 302.

As noted above, the communication device 106 may be configured to communicate using wireless and/or wired communication circuitry. The communication device 106 may be configured to perform methods for more flexible triggering of aperiodic SRS transmission by a UE, as further described herein.

As described herein, the communication device 106 may include hardware and software components for implementing the above features for a communication device 106 to communicate a scheduling profile for power savings to a network. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300, 304, 306, 310, 320, 329, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, cellular communication circuitry 330 and short to medium range wireless communication circuitry 329 may each include one or more processing elements. In other words, one or more processing elements may be included in cellular communication circuitry 330 and, similarly, one or more processing elements may be included in short to medium range wireless communication circuitry 329. Thus, cellular communication circuitry 330 may include one or more integrated circuits (ICs) that are configured to perform the functions of cellular communication circuitry 330. In addition, each integrated circuit may include circuitry (e.g., first circuitry, second circuitry, etc.) configured to perform the functions of cellular communication circuitry 330. Similarly, the short to medium range wireless communication circuitry 329 may include one or more ICs that are configured to perform the functions of short to medium range wireless communication circuitry 329. In addition, each integrated circuit may include circuitry (e.g., first circuitry, second circuitry, etc.) configured to perform the functions of short to medium range wireless communication circuitry 329.

Figure 4:
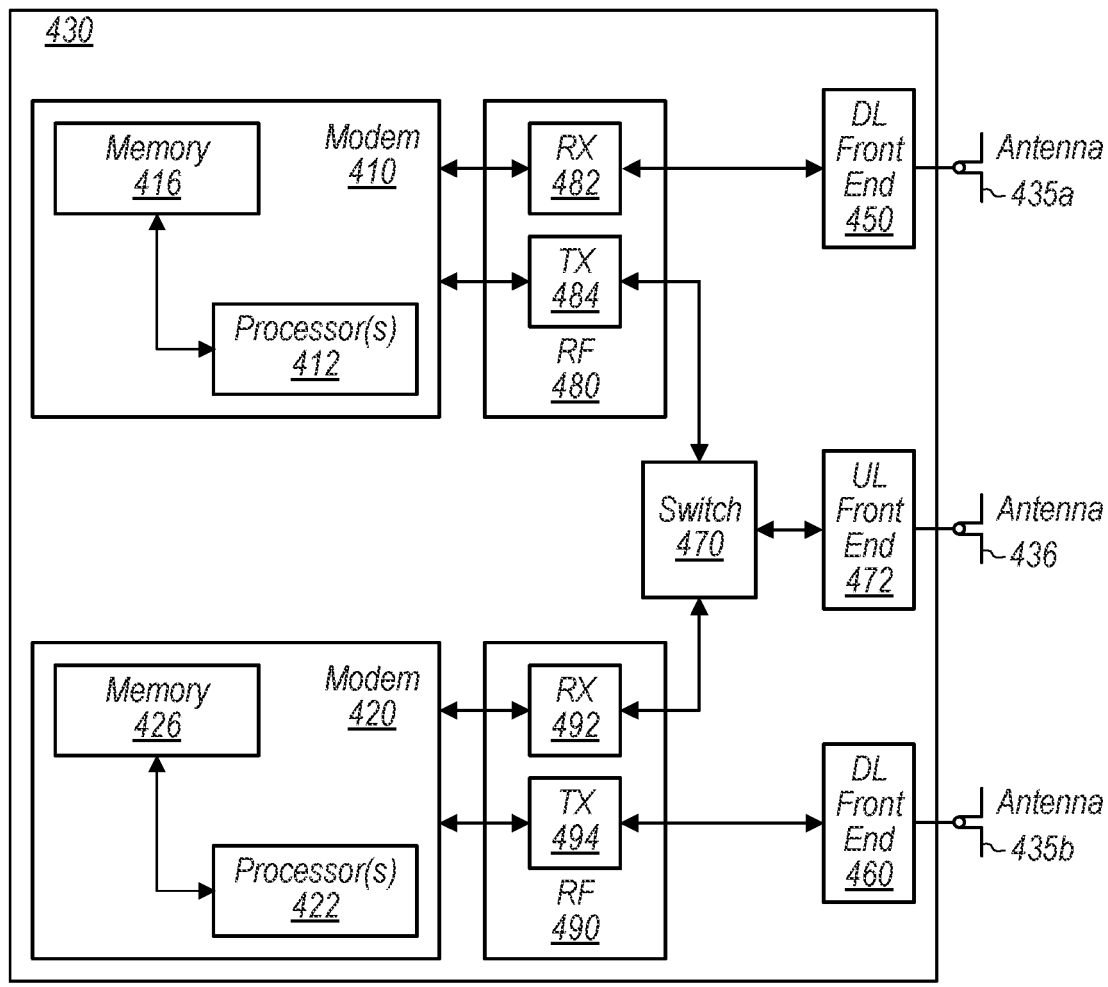
FIG. 4 illustrates an example block diagram of cellular communication circuitry, according to some embodiments.

FIG. 4: Cellular Communication Circuitry Block Diagram

FIG. 4 illustrates an example simplified block diagram of cellular communication circuitry, according to some embodiments. It is noted that the block diagram of the cellular communication circuitry of FIG. 4 is only one example of a possible cellular communication circuit. According to embodiments, cellular communication circuitry 430 may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 430 may couple (e.g., communicatively; directly or indirectly) to one or more antennas, such as antennas 435*a-b* and 436 as shown (in FIG. 4). In some embodiments, cellular communication circuitry 330 may include dedicated receive chains (including and/or coupled to, e.g., communicatively; directly or indirectly. dedicated processors and/or radios) for multiple RATs (e.g., a first receive chain for LTE and a second receive chain for 5G NR). For example, as shown in FIG. 4, cellular communication circuitry 430 may include a modem 410 and a modem 420. Modem 410 may be configured for communications according to a first RAT, e.g., such as LTE or LTE-A, and modem 420 may be configured for communications according to a second RAT, e.g., such as 5G NR.

As shown, modem 410 may include one or more processors 412 and a memory 416 in communication with processors 412. Modem 410 may be in communication with a radio frequency (RF) front end 480. RF front end 480 may include circuitry for transmitting and receiving radio signals. For example, RF front end 480 may include receive circuitry (RX) 482 and transmit circuitry (TX) 484. In some embodiments, receive circuitry 482 may be in communication with downlink (DL) front end 450, which may include circuitry for receiving radio signals via antenna 435*a*.

Similarly, modem 420 may include one or more processors 422 and a memory 426 in communication with processors 422. Modem 420 may be in communication with an RF front end 490. RF front end 490 may include circuitry for transmitting and receiving radio signals. For example, RF front end 490 may include receive circuitry 492 and transmit circuitry 494. In some embodiments, receive circuitry 492 may be in communication with DL front end 460, which may include circuitry for receiving radio signals via antenna 435*b*.

In some embodiments, a switch 470 may couple transmit circuitry 494 to uplink (UL) front end 472. In addition, switch 470 may couple transmit circuitry 494 to UL front end 472. UL front end 472 may include circuitry for transmitting radio signals via antenna 436. Thus, when cellular communication circuitry 430 receives instructions to transmit according to the first RAT (e.g., as supported via modem 410), switch 470 may be switched to a first state that allows modem 410 to transmit signals according to the first RAT (e.g., via a transmit chain that includes transmit circuitry 434 and UL front end 472). Similarly, when cellular communication circuitry 430 receives instructions to transmit according to the second RAT (e.g., as supported via modem 420), switch 470 may be switched to a second state that allows modem 420 to transmit signals according to the second RAT (e.g., via a transmit chain that includes transmit circuitry 494 and UL front end 472).

In some embodiments, the cellular communication circuitry 430 may be configured to perform methods for more flexible triggering of aperiodic SRS transmission by a UE, as further described herein.

As described herein, the modem 410 may include hardware and software components for implementing the above features or for time division multiplexing UL data for NSA NR operations, as well as the various other techniques described herein. The processors 412 may be configured to implement part or all of the features described herein, e.g., by executing program instructions stored on a memory medium (e.g., a non-transitory computer-readable memory medium). Alternatively (or in addition), processor 412 may be configured as a programmable hardware element, such as an FPGA (Field Programmable Gate Array), or as an ASIC (Application Specific Integrated Circuit). Alternatively (or in addition) the processor 412, in conjunction with one or more of the other components 430, 432, 434, 450, 470, 472, 435 and 436 may be configured to implement part or all of the features described herein.

In addition, as described herein, processors 412 may include one or more processing elements. Thus, processors 412 may include one or more integrated circuits (ICs) that are configured to perform the functions of processors 412. In addition, each integrated circuit may include circuitry (e.g., first circuitry, second circuitry, etc.) configured to perform the functions of processors 412.

As described herein, the modem 420 may include hardware and software components for implementing the above features for communicating a scheduling profile for power savings to a network, as well as the various other techniques described herein. The processors 422 may be configured to implement part or all of the features described herein, e.g., by executing program instructions stored on a memory medium (e.g., a non-transitory computer-readable memory medium). Alternatively (or in addition), processor 422 may be configured as a programmable hardware element, such as an FPGA (Field Programmable Gate Array), or as an ASIC (Application Specific Integrated Circuit). Alternatively (or in addition) the processor 422, in conjunction with one or more of the other components 440, 442, 444, 450, 470, 472, 435 and 436 may be configured to implement part or all of the features described herein.

In addition, as described herein, processors 422 may include one or more processing elements. Thus, processors 422 may include one or more integrated circuits (ICs) that are configured to perform the functions of processors 422. In addition, each integrated circuit may include circuitry (e.g., first circuitry, second circuitry, etc.) configured to perform the functions of processors 422.

Figure 5:
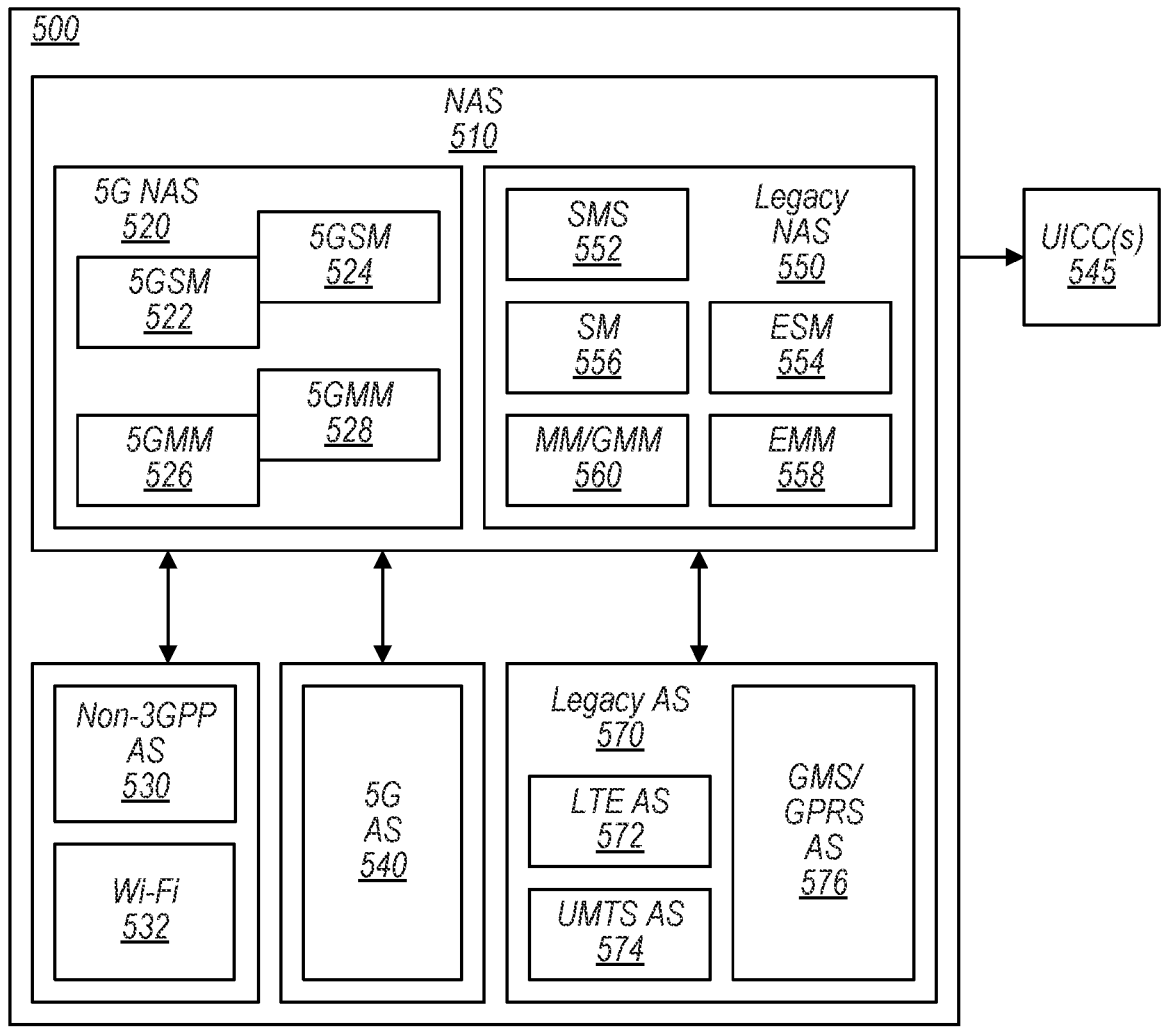
FIG. 5 illustrates an example of a baseband processor architecture for a UE, according to some embodiments.

FIG. 5: UE Baseband Processor Architecture

FIG. 5 illustrates an example of a baseband processor architecture for a UE (e.g., such as UE 106), according to some embodiments. The baseband processor architecture 500 described in FIG. 5 may be implemented on one or more radios (e.g., radios 329 and/or 330 described above) or modems (e.g., modems 410 and/or 420) as described above. As shown, the non-access stratum (NAS) 510 may include a 5G NAS 520 and a legacy NAS 550. The legacy NAS 550 may include a communication connection with a legacy access stratum (AS) 570. The 5G NAS 520 may include communication connections with both a 5G AS 540 and a non-3GPP AS 530 and Wi-Fi AS 532. The 5G NAS 520 may include functional entities associated with both access stratums. Thus, the 5G NAS 520 may include multiple 5G MM entities 526 and 528 and 5G session management (SM) entities 522 and 524. The legacy NAS 550 may include functional entities such as short message service (SMS) entity 552, evolved packet system (EPS) session management (ESM) entity 554, session management (SM) entity 556, EPS mobility management (EMM) entity 558, and mobility management (MM)/GPRS mobility management (GMM) entity 560. In addition, the legacy AS 570 may include functional entities such as LTE AS 572, UMTS AS 574, and/or GSM/GPRS AS 576.

Thus, the baseband processor architecture 500 allows for a common 5G-NAS for both 5G cellular and non-cellular (e.g., non-3GPP access). Note that as shown, the 5G MM may maintain individual connection management and registration management state machines for each connection. Additionally, a device (e.g., UE 106) may register to a single PLMN (e.g., 5G CN) using 5G cellular access as well as non-cellular access. Further, it may be possible for the device to be in a connected state in one access and an idle state in another access and vice versa. Finally, there may be common 5G-MM procedures (e.g., registration, de-registration, identification, authentication, as so forth) for both accesses.

Note that in various embodiments, one or more of the above described functional entities of the 5G NAS and/or 5G AS may be configured to perform methods of flexible triggering of aperiodic SRS transmission by a UE, e.g., as further described herein.

Aperiodic Sounding Reference Signal

In current cellular communication systems, the UE can be configured to periodically, semi-persistently, or aperiodically transmit a Sounding Reference Signal (SRS) to the base station on an uplink channel. The SRS signal is used by the base station to assess the uplink channel quality between the UE and the base station. More particularly, in cellular systems the base station often allocates only a portion of the full system bandwidth to a specific UE at any given time. The base station may use the received SRS signal to determine which portion of the overall system bandwidth has the best relative uplink channel quality. In other words, the base station may use the received SRS signals from various UEs to allocate the "best" frequency region to each of the UEs, based on the uplink channel quality determined from the received SRS signals.

The UE may transmit the SRS signal for various purposes or use cases, including antenna switching, beam management, codebook and noncodebook-based purposes, and for carrier switching. Antenna switching refers to a process whereby the UE may cycle through transmitting an SRS signal on each of its multiple antennas so that the base station can assess the downlink channel quality via an uplink channel quality estimate for each antenna. The UE may also transmit an SRS for the purpose of beam management, e.g., to allow the base station to assess the best beam orientation for improved uplink channel quality. The noncodebook-based use case refers to the base station using the received SRS to assess the downlink channel, assuming the uplink and downlink channels are similar (e.g., in the TDD case) and to aid in selecting a codebook for downlink communication. The term "carrier switching" refers to a situation where one or more UEs may be switching to use of a different component carrier, or different bandwidth part, in communicating with the base station.

A UE may be configured to transmit an SRS signal at predefined intervals, i.e., according to a set period. However, the base station can also make a specific aperiodic request for the UE to transmit an SRS signal. The base station's request for an aperiodic SRS may take the form of an SRS trigger that is transmitted from the base station to the UE. The base station may decide to send an aperiodic SRS trigger to the UE due to detection of degradation in uplink channel quality, or other reasons.

In current implementations, the base station can perform aperiodic SRS (AP-SRS) triggering in various DCI formats, including UL DCI formats 0_1 and 0_2, DL DCI formats 1_1 and 1_2 and DL format 2_3. Downlink Control Information has multiple fields that are configured during RRC, as defined in 3GPP Technical Specification 38.212 The relevant fields in DCI Format 0_1 are described below, it being noted that DCI Format 0_2 is similar.

Per 3GPP Technical Specification 38.212, Section 7.3.1.1.2, DCI format 0_1 is used for the scheduling of one or multiple PUSCH in one cell, or indicating configured grant (CG) PUSCH to a UE. The following information (among others) is transmitted by means of the DCI format 0_1 with CRC scrambled by C-RNTI or CS-RNTI or SP-CSI-RNTI or MCS-C-RNTI:
1) Time domain resource assignment—0, 1, 2, 3, 4, 5, or 6 bits
2) SRS resource indicator
3) SRS request—2 bits as defined by Table 7.3.1.1.2-24 for UEs not configured with supplementaryUplink in ServingCellConfig in the cell; 3 bits for UEs configured with supplementaryUplink in ServingCellConfig in the cell where the first bit is the non-SUL/SUL indicator as defined in Table 7.3.1.1.1-1 and the second and third bits are defined by Table 7.3.1.1.2-24. This bit field may also indicate the associated CSI-RS according to Clause 6.1.1.2 of [6, TS 38.214].
4) CSI request—0, 1, 2, 3, 4, 5, or 6 bits determined by higher layer parameter reportTriggerSize.
5) UL-SCH indicator—0 or 1 bit.

It is noted that a UE is not expected to receive downlink control information having a DCI format 0_1 or DCI format 0_2 with UL-SCH indicator of "0" and a CSI request of all zero(s).

Further, a special DCI format 2_3 can be used to trigger AP-SRS for multiple UEs in a cell. Currently, DCI format 2_3 is used only for SRS carrier switching, i.e., when the UEs are switching to a different component carrier.

Current methods used to trigger an aperiodic SRS lack sufficient flexibility to accommodate all of the various scenarios where an aperiodic SRS may be desired. Therefore, improvements in the field are desired.

Figure 6A:
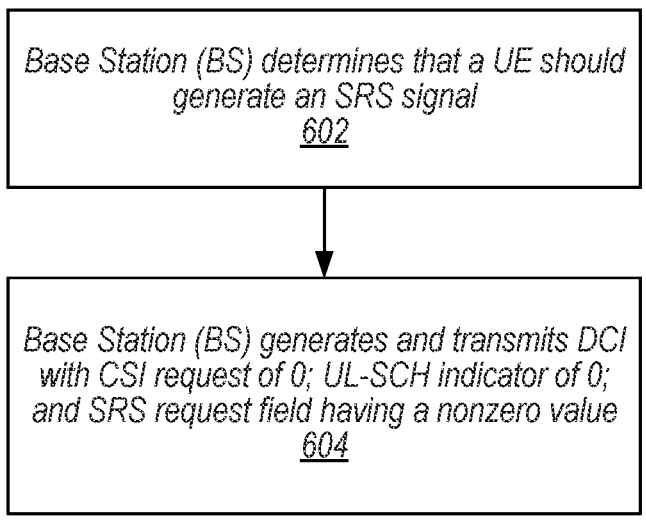
FIGS. 6A and 6B are flowchart diagrams illustrating transmission of an SRS trigger to a UE, according to some embodiments.
Figure 6B:
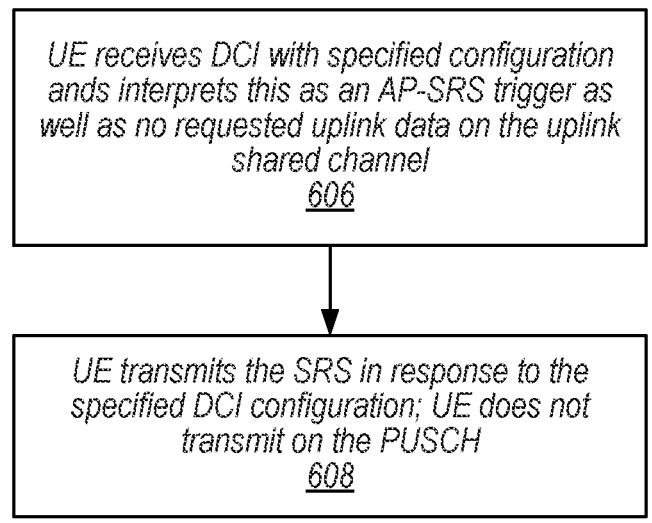

FIGS. 6A and 6B: Flexible Aperiodic SRS Triggering

Various embodiments described herein relate to improved methods for allowing a base station to trigger UE generation of an aperiodic SRS.

FIGS. 6A and 6B are flowchart diagrams illustrating operation according to one embodiment whereby the base station has increased flexibility in transmitting an SRS trigger to the UE. FIG. 6A illustrates base station operation and FIG. 6B illustrates UE operation As shown in FIG. 6A, in 602 the base station may determine that a UE should transmit an aperiodic sounding reference signal (SRS) to the base station. This determination may be made for any of various reasons, such as a detection of signal quality degradation on the uplink channel, among others.

In 604 the base station may transmit downlink control information (DCI) to the UE. The downlink control information may include one or more parameter fields set to specific values. For example, the downlink control information may include a first parameter field set to a first specific value and a second parameter field set to a second specific value. The first parameter field set to the first specific value and the second parameter field set to the second specific value together may indicate to the UE that the UE should transmit an aperiodic SRS to the base station without any accompanying data. Examples of these fields include the CSI request field and the UL-SCH indicator field, among possible others.

More particularly, in one embodiment, the base station (e.g., the gNB) is allowed to schedule the fields in DCI Format 0_1 and 0_2 as follows:
"UL-SCH indicator" field: 0
"CSI request" field: 0;
"SRS request" field: nonzero
When the above fields have the values indicated above, the UE expected behavior is as follows:
UE will not transmit on the Physical Uplink Shared Channel (PUSCH)
UE will transmit the AP-SRS corresponding to the non-zero value in the "SRS request" field in the DCI.

Thus, in some embodiments, for DCI formats 0_1 and 0_2, the base station may indicate an aperiodic SRS trigger while also specifying an uplink shared channel (UL-SCH) indicator of 0 and a channel state information (CSI) request of all zeros. When the UE receives downlink control information in DCI formats 0_1 and 0_2 and the (UL-SCH) indicator is set to 0 and also the channel state information (CSI) request is all zeros, the combination of values may indicate that no uplink data is being requested on the uplink shared channel. In addition, the SRS request may have a nonzero value, which indicates an aperiodic SRS trigger to the UE.

As shown in FIG. 6B, in 606 the UE receives the DCI with the specified configuration (the configuration in 604) and may interpret this as an AP-SRS trigger and also that the UE will not transmit any accompanying data on the PUSCH. In other words, the UE is configured to understand that when it receives downlink control information configured as described above in 804, the UE interprets this as being an SRS trigger as well as no requested uplink data on the uplink shared channel.

In 608 the UE may transmit the SRS in response to the specified DCI configuration, i.e., based on the nonzero value in the SRS request field. Thus here the UE has interpreted the received DCI configuration to mean that an SRS is to be generated, and also that no accompanying data need be generated on the PUSCH.

In some embodiments, for DCI format 0_1, and 0_2, the following DCI Format is determined by the UE to be invalid:
"CSI request" field: 0
"UL-SCH" indicator" field: 0
"SRS request" field: 0

In another embodiment, the base station (e.g., gNB) is allowed to schedule the fields in DCI Format 0_1 and 0_2 as follows:
"CSI request" field: 0
"UL-SCH indicator" field: 0
"SRS request" field: nonzero
The below fields in the DCI may be interpreted by the UE with a new meaning as follows:
"Time domain resource assignment" field: the slot offset of the AP-SRS
"SRS resource indicator" field: QCL (beam) of the AP-SRS Thus the "Time domain resource assignment" field may be repurposed to a new meaning—now indicating the slot offset of the AP-SRS. In addition, the "SRS resource indicator" field may be repurposed to a new meaning—now indicating the quasi co-location (QCL), or the beam, of the AP-SRS. It is noted that other fields may be used instead of, or in addition to, the above fields.

Aperiodic SRS Triggering for Fallback DCI Formats

In another embodiment, the base station may use DCI format 2_3 to trigger any type of aperiodic SRS transmission. In other words, in this embodiment DCI format 2_3 can be used to trigger an aperiodic SRS transmission for any of various purposes, including codebook based, non-codebook based, and beam management, as well as antenna switching and carrier switching. Thus, the base station may generate and transmit downlink control information (DCI) of Format 2_3 and use this DCI Format 2_3 to specify aperiodic SRS transmission to the UE for any of various purposes. When the UE receives DCI of Format 2_3 and configured to indicate an SRS trigger, the UE may response by transmitting an SRS at the appropriate slot offset.

FIG. 7: Aperiodic SRS Triggering for Groups of UEs

In current cellular standards, DCI format 2_3 is used to trigger an aperiodic SRS for a group of UEs. However, additional flexibility is desired, i.e., it would be desirable to have another DCI format useable to SRS trigger multiple UEs. Thus, in another embodiment, the base station may utilize a new DCI format that is useable to trigger an aperiodic SRS for a group of UEs. In other words, this new DCI format may be used to trigger each UE in a group of UEs to generate an aperiodic SRS, and may have reduced latency compared to prior formats.

Figure 7A:
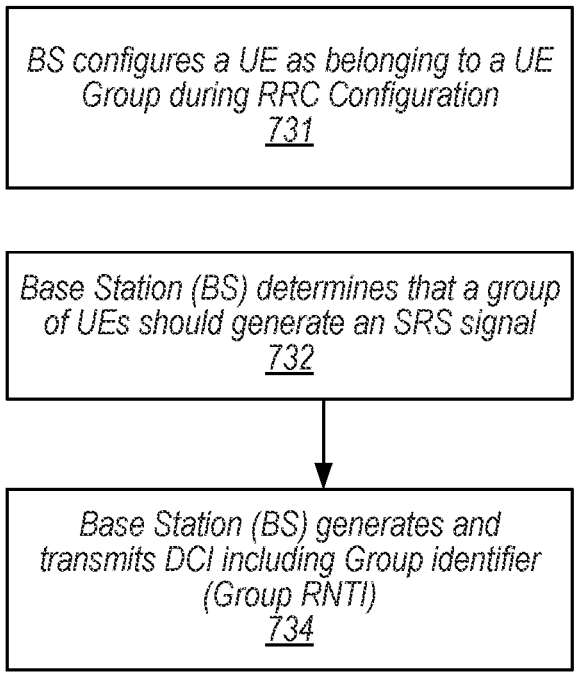
FIGS. 7A and 7B are flowchart diagrams illustrating a method for transmitting DCI information operable for triggering multiple UEs, according to some embodiments.
Figure 7B:
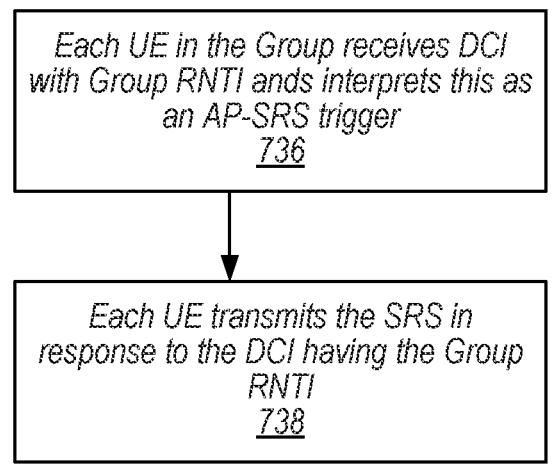

FIGS. 7A and 7B are flowcharts illustrating operation of the base station configuring a plurality of UEs in a group and then using this new DCI format to trigger an AP-SRS for each of the UEs in the group, or each UE in multiple groups. This may provide for greater efficiency, e.g., that the base station can more efficiently trigger an SRS in a group of UEs with a single DCI message. FIG. 7A illustrates base station operation and FIG. 7B illustrates UE operation.

As shown, in 731 during RRC configuration the base station may configure each of a plurality of UEs as belonging to a UE group. Stated another way, for each UE, during RRC configuration the network (or base station) can configure the group to which a respective UE belongs. The assignment of a plurality of UEs to a group allows use of a new DCI format that can be used to target or address one group or multiple groups of UEs for SRS triggering. For each UE in the group, the AP-SRS trigger state can be independently indicated, or alternatively the same AP-SRS trigger state may be indicated for all the UEs in the same group in order to reduce the DCI size.

Later during UE operation, at 732 the base station may determine that a group of UEs should generate an SRS signal. As noted above, this determination may be based on an assessment of uplink channel quality degradation for various of the UEs in the group, among other possible reasons.

At 734 the base station may create and transmit a DCI message containing an SRS trigger and also comprising a group identifier that identifies the group of UEs for which an SRS trigger is desired.

The cyclic redundancy check (CRC) of the new DCI format may be scrambled with an aperiodic Sounding Reference Signal-Radio Network Temporary Identifier (SRS-RNTI) which is common for all of the UEs in the group. This aperiodic SRS-RNTI may be used to identify the UEs in the group being targeted. Thus, when each of the UEs in the group receives the DCI information with the aperiodic SRS-RNTI, each UE may recognize this AP-SRS-RNTI, and recognition of this AP-SRS-RNTI, as well as the new DCI format itself, indicates to the UE that it should generate an aperiodic SRS.

Alternatively, or in addition, the cyclic redundancy check (CRC) of the new DCI format may be scrambled with a Group aperiodic SRS-RNTI which is different for each group of UEs. This Group AP-SRS-RNTI may be used to identify the UEs in the group being targeted.

The DCI message transmitted by the base station may comprise information identifying a plurality of groups of UEs, wherein each group comprises a plurality of UEs. Thus, the new DCI format is not limited to provide an SRS trigger to a single group, but rather can target or identify multiple groups, where each group itself comprises a plurality of UEs.

Figure 8:
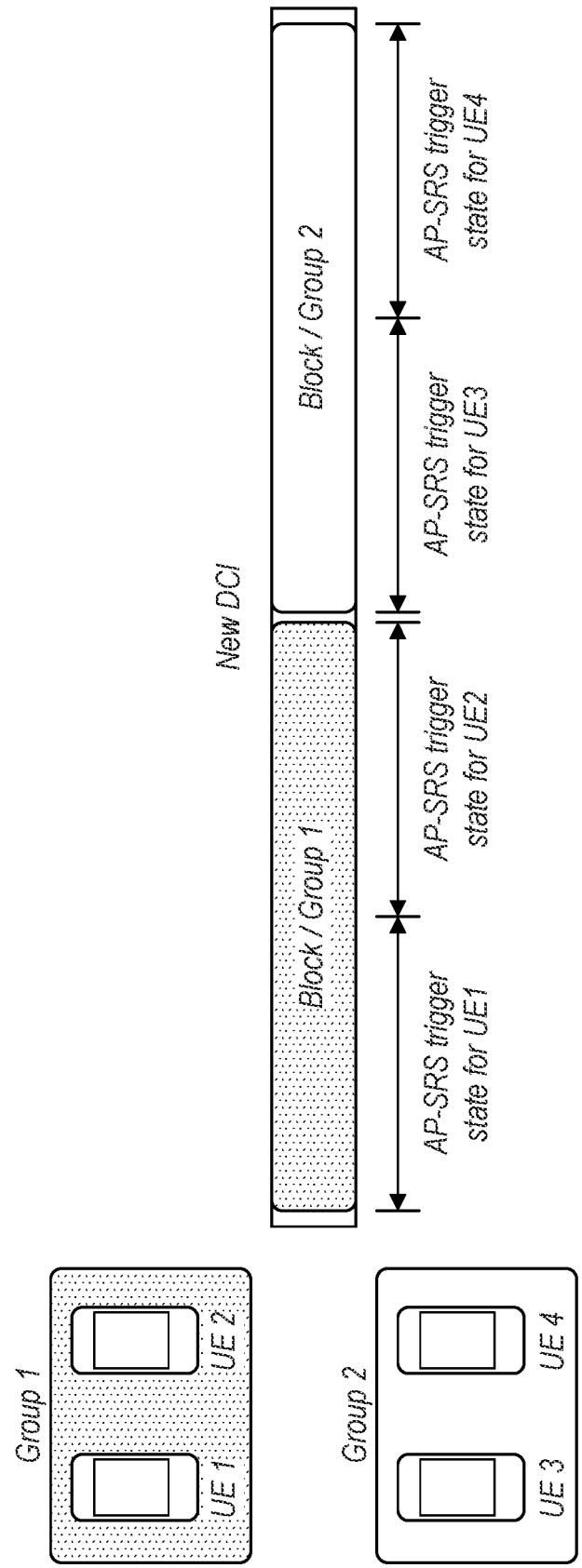
FIG. 8 illustrates a format of downlink control information (DCI) operable for triggering multiple UEs in two or more groups, according to some embodiments.

FIG. 8 illustrates two different UE groups and also shows the new DCI format for addressing multiple groups of UEs. As shown, where two separate groups are being targeted by the DCI message, the DCI message may include a first portion for group 1 and a second portion for group 2. Each respective portion may include an AP-SRS trigger state for each UE in the group. In other words, for each group portion, the DCI message may include a sub-portion for each UE that independently indicates the AP-SRS trigger state information for each UE in the respective group.

FIG. 7B illustrates UE operation. As shown, at 736 each UE in the group (or most UEs) receive the DCI message with the RNTI identifying the group to which the UE belongs. The UE may process the information in the DCI message, and in particular may locate and process the AP-SRS trigger state that is particular for the respective UE.

In 738 each UE may then transmit an SRS to the base station in response to receiving the DCI having the group RNTI.

Aperiodic SRS Triggering for Fallback DCI Formats

In another embodiment, the aperiodic SRS can be triggered by a large set of DCI formats, e.g., more DCI formats than allowed under current standards. More specifically, an SRS request field may be introduced for "fallback" DCI format 0_0 for uplink and DCI format 1_0 for downlink. In this embodiment, the AP-SRS field is now included or introduced in the downlink control information for DCI formats 0_0 and 1_0.

The following is some background on DCI formats. Current cellular standards allow for a number of DCI formats. For regular (or non-fallback) DCI formats the size and bit width of each field is RRC configurable. However, there is a chance that the RRC configuration could have some ambiguity, or that the UE could not properly interpret the RRC configuration. The fallback DCI 0_0 and 1_0 formats are statically defined in the specification and are used by the base station to communicate with the UE as a "last resort" or as a mechanism to ensure that the RRC configuration between the base station and the UE remains synchronized. These DCI formats are referred to as the "fallback DCI" as they are the DCI formats that the base station can always use to communicate with the UE, regardless of any errors or ambiguities in a prior RRC configuration. By including an AP-SRS field in the fallback DCI formats, this helps guarantee that the base station can always trigger an AP-SRS regardless of any prior issue with the RRC configuration or other DCI format configurations.

Multiple-TRP Aperiodic SRS Triggering

In many instances a UE operates in a multiple Transmit Receive Point (multi-TRP) scenario where the UE is communicating with multiple base stations. In a multi-TRP scenario, the UE may desire (or be instructed) to dynamically transmit an aperiodic SRS to one of the TRPs. When this occurs, the UE may need to dynamically change its transmit beam. However, currently the UE's transmit beam is statically configured during RRC as spatialRelationInfo in the SRS-Resource. The UE may also need to dynamically change its open loop power control. However, currently power control is statically configured by RRC in SRS-ResourceSet. Therefore, improvements in the field are desired.

In some embodiment, for AP-SRS, the base station may use DCI to dynamically change the beam and/or spatial relation of the AP-SRS. This change information can be indicated as: 1) a separate SRI, i.e. SRS Resource Indicator; 2) a separate spatial relation configuration; or 3) a separate TCI (transmission configuration indicator)

In some embodiments, for AP-SRS, DCI or MAC-CE can be allowed to dynamically change the open loop power control. This may include setting, including one or multiple or all of the following: The alpha; The p0, The pathloss-ReferenceRS.

Thus, this method may use DCI or a MAC-CE to optimize power for the AP-SRS to better correspond with the base station's needs. This may allow the UE to find the best Tx/Rx relationship that corresponds to a certain base station.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Any of the methods described herein for operating a user equipment (UE) may be the basis of a corresponding method for operating a base station, by interpreting each message/signal X received by the UE in the downlink as message/signal X transmitted by the base station, and each message/signal Y transmitted in the uplink by the UE as a message/signal Y received by the base station.

Although the embodiments above have been described in considerable detail, numerous variations and modifications will become apparent to those skilled in the art once the above disclosure is fully appreciated. It is intended that the following claims be interpreted to embrace all such variations and modifications.

In some embodiments, a wireless device may be configured to transmit downlink control information (DCI) to the UE. The downlink control information may have a DCI format of 0_1 or 0_2. Additionally or alternatively, the downlink control information may further comprise an uplink—shared channel (UL-SCH) indicator set to 0, a channel state information (CSI) request field set to all 0s, and an SRS request field that has a nonzero value. In some embodiments, the DCI may indicate to the UE that the UE should transmit an aperiodic SRS to the base station corresponding to the nonzero value in the SRS request field and wherein no uplink data is requested to be transmitted on the uplink shared channel. Additionally or alternatively, the wireless device may be configured to receive an aperiodic SRS signal from the UE, wherein the aperiodic SRS signal is received from the UE in response to the DCI transmitted by the cellular base station According to some embodiments, the DCI may comprise a channel state information (CSI) request field with value 0, an uplink shared channel indicator (UL-SCH) field with value 0 and an SRS request field of value 0. Additionally or alternatively, the DCI having these values may be interpreted by the UE as an invalid DCI. According to some embodiments, the DCI may include a time domain resource assignment field having a value that specifies a slot offset of the aperiodic SRS. wherein the DCI includes an SRS resource indicator field that specifies beam information useable by the UE when transmitting the aperiodic SRS to the base station.

In some embodiments, a cellular base station may be configured to determine that a plurality of user equipment devices (UEs) should transmit an aperiodic sounding reference signal (SRS) to the base station. Additionally or alternatively, the base station may be further configured to transmit a downlink control information (DCI) message to the plurality of UEs, and wherein the DCI message may include information useable in identifying each of the plurality of UEs. In some embodiments, the DCI message may be configured to cause each of the plurality of UEs to transmit an SRS signal to the base station. Additionally or alternatively, the information may be useable in identifying each of the plurality of UEs comprises a radio network temporary identifier (RNTI) that is common for each of the plurality of UEs. According to some embodiments, the information may be useable in identifying each of the plurality of UEs comprises a cyclic redundancy check (CRC) scrambled with an aperiodic SRS radio network temporary identifier that is common for each of the plurality of UEs.

According to further embodiments, a base station may be configured to establish a radio resource control (RRC) connection with each of the plurality of UEs in a group, wherein during establishment of the RRC connection with each respective UE of the plurality of UEs, the base station may operate to configure each respective UE as being a member of the group. Additionally or alternatively, a DCI message may comprise an aperiodic SRS trigger state for each of the plurality of UEs in the group. In some embodiments, the base station may be further configured to determine that a plurality of groups of user equipment devices (UEs) should transmit an aperiodic sounding reference signal (SRS) to the base station, wherein each group of UEs may comprise a plurality of UEs. Additionally or alternatively, the base station may be configured to transmit a downlink control information (DCI) message to the plurality of groups of UEs, wherein the DCI message may include information useable in identifying each of the plurality of groups of UEs, and wherein the DCI message may be configured to cause each of the plurality of UEs in each of the groups to generate an SRS signal to the base station. According to some embodiments, the information useable in identifying each of the plurality of groups of UEs may comprise a plurality of group radio network temporary identifiers (RNTIs), wherein each respective group RNTI identifies UEs belonging to the respective group.

In some embodiments, a wireless device may be configured to determine that a plurality of user equipment devices (UEs) should transmit an aperiodic sounding reference signal (SRS) to a base station. Additionally or alternatively, the wireless device may be further configured to transmit a downlink control information (DCI) message to the plurality of UEs, wherein the DCI message includes information useable in identifying each of the plurality of UEs, wherein the DCI message is configured to cause each of the plurality of UEs to transmit an SRS signal to the base station.

According to some embodiments, a cellular base station may be configured to transmit downlink control information (DCI) to the UE, wherein the downlink control information may have one of DCI format 0_0 or 0_1 and may include an SRS request field useable in triggering a UE to transmit an SRS. Additionally or alternatively, the cellular base station may be further configured to receive an aperiodic SRS signal from the UE, wherein the aperiodic SRS signal may be received from the UE in response to the DCI transmitted by the cellular base station.

In some embodiments, a UE and/or baseband processor of a UE may be configured to receive downlink control information (DCI) from the base station, wherein the downlink control information may have one of DCI format 0_0 or 0_1 and may include an SRS request field configured to trigger the UE to transmit an SRS. Additionally or alternatively, the UE and/or base band processor of a UE may be further configured to transmit an aperiodic SRS signal to the base station, wherein the aperiodic SRS signal may be transmitted by the UE and/or baseband processor in response to the DCI received from the cellular base station.

What is claimed is:

1. A method, comprising:
transmitting downlink control information (DCI) to a user equipment (UE) including an indication to the UE to transmit aperiodic sounding reference signaling (SRS) only when the DCI includes at least one first parameter field set to indicate no uplink shared channel (UL-SCH) is requested from the UE, at least one second parameter field set to indicate no channel state information (CSI) is requested from the UE, and at least one third parameter field that requests transmission of aperiodic SRS to a cellular base station, wherein when the UE is communicating with multiple transmission reception points (TRPs), the DCI further includes an indication to the UE to adjust its open loop power control and to perform at least one of a changing of a beam used to transmit the aperiodic SRS or a changing of a spatial relation of the aperiodic SRS; and
receiving an aperiodic SRS transmission from the UE, wherein the aperiodic SRS transmission is received from the UE in response to transmission of the DCI.

2. The method of claim 1,
wherein the downlink control information has a DCI format of 0_1 or 0_2.

3. The method of claim 2,
wherein the at least one first parameter field comprises a UL-SCH indicator set to 0, wherein the at least one second parameter field comprises a CSI request field set to all 0s,
wherein the at least one third parameter field comprises an SRS request field that has a nonzero value,
wherein the DCI indicates to the UE that the UE should transmit an aperiodic SRS to the cellular base station corresponding to the nonzero value in the SRS request field, and wherein no uplink data is requested to be transmitted on the UL-SCH.

4. The method of claim 1,
wherein, when the DCI comprises a CSI request field with value 0, an UL-SCH field with value 0, and an SRS request field of value 0, the DCI is interpreted by the UE as an invalid DCI.

5. The method of claim 1,
wherein the DCI includes a field having a value that specifies a slot offset of the aperiodic SRS transmission.

6. The method of claim 5,
wherein the DCI includes an SRS resource indicator field that specifies beam information useable by the UE when transmitting the aperiodic SRS transmission to the base station.

7. The method of claim 1, further comprising:
determining that the UE should transmit aperiodic SRS to the base station; and
transmitting the DCI in response to the determination that the UE should transmit aperiodic SRS to the cellular base station.

8. A processor, comprising:
circuitry configured to:
receive downlink control information (DCI) from a base station;
process the DCI received from the base station as including an indication to transmit aperiodic sounding reference signaling (SRS) only when the DCI includes at least one first parameter field set to indicate no uplink—shared channel (UL-SCH) is requested from a user equipment (UE), at least one second parameter field set to indicate no channel state information (CSI) is requested from the UE, and at least one third parameter field that requests transmission of aperiodic SRS to the base station, wherein when the UE is communicating with multiple transmission reception points (TRPs), the DCI further includes an indication to the UE to adjust its open loop power control and to perform at least one of a changing of a beam used to transmit the aperiodic SRS or a changing of a spatial relation of the aperiodic SRS; and
transmit an aperiodic SRS transmission to the base station in response to receipt of the DCI.

9. The processor of claim 8,
wherein the DCI has a DCI format of 0_1 or 0_2.

10. The processor of claim 8,
wherein when the DCI includes a UL-SCH indicator set to 0, a CSI request field set to 0 and an SRS request field having a zero value,
the circuitry is configured to interpret the DCI as an invalid DCI.

11. The processor of claim 8,
wherein the DCI includes a field having a value that specifies a slot offset of the aperiodic SRS transmission.

12. The processor of claim 8,
wherein the DCI includes an SRS resource indicator field that specifies beam information useable by the UE when transmitting the aperiodic SRS transmission to the base station.

13. A method, comprising:
receiving downlink control information (DCI) from a base station;
processing the DCI received from the base station as including an indication to transmit aperiodic sounding reference signaling (SRS) only when the DCI includes at least one first parameter field set to indicate no uplink—shared channel (UL-SCH) is requested from a user equipment (UE), at least one second parameter field set to indicate no channel state information (CSI) is requested from the UE, and at least one third parameter field that requests transmission of aperiodic SRS to the base station, wherein when the UE is communicating with multiple transmission reception points (TRPs), the DCI further includes an indication to the UE to adjust its open loop power control and to perform at least one of a changing of a beam used to transmit the aperiodic SRS or a changing of a spatial relation of the aperiodic SRS; and transmitting an aperiodic SRS transmission to the base station in response to receipt of the DCI.

14. The method of claim 13, further comprising:

transmitting the aperiodic SRS transmission to the base station in response to receipt of the DCI, wherein the UE does not transmit data on the physical uplink shared channel (PUSCH) in response to receipt of the DCI with the UL-SCH set to 0 and the CSI request field set to 0.

15. The method of claim 13, wherein the DCI has a DCI format of 0_1 or 0_2.

16. The method of claim 13, further comprising:

receiving second DCI from the base station, wherein when the DCI includes a UL-SCH indicator set to 0, a CSI request field set to 0 and an SRS request field having a zero value, the method further comprises interpreting the DCI as an invalid DCI.

17. The method of claim 13, wherein the DCI includes a time domain resource assignment field having a value that specifies a slot offset of the aperiodic SRS transmission.

18. The method of claim 13, wherein the DCI includes an SRS resource indicator field that specifies beam information useable by the UE when transmitting the aperiodic SRS transmission to the base station.

19. The method of claim 13, wherein the method is performed by a processor.

20. The method of claim 19, wherein the processor is a baseband processor.

* * * * *